(12) United States Patent
Argoud

(10) Patent No.: US 8,792,606 B2

(45) Date of Patent: Jul. 29, 2014

(54) DEVICE FOR TRANSFERRING NUCLEAR FUEL CANISTERS BETWEEN AND A TRANSPORT CONTAINER AND A STORAGE DEVICE

(75) Inventor: Jean-Claude Argoud, Montbonnot (FR)

(73) Assignee: Commissariat a l'Energie Atomique, Paris (FR)

( * ) Notice: Subject to any disclaimer, the term of this patent is extended or adjusted under 35 U.S.C. 154(b) by 646 days.

(21) Appl. No.: 12/516,186

(22) PCT Filed: Nov. 30, 2007

(86) PCT No.: PCT/EP2007/063040

§ 371 (c)(1), (2), (4) Date: Jun. 8, 2009

(87) PCT Pub. No.: WO2008/068190

PCT Pub. Date: Jun. 12, 2008

(65) Prior Publication Data

US 2010/0027730 A1 Feb. 4, 2010

(30) Foreign Application Priority Data

Dec. 4, 2006 (FR) .................................... 06 55295

(51) Int. Cl.
*G21C 19/32* (2006.01)
*G21F 7/005* (2006.01)
*G21C 19/00* (2006.01)

(52) U.S. Cl.
USPC .......................... 376/268; 376/260; 376/272

(58) Field of Classification Search
CPC ............ G21C 19/32; G21F 7/005; G21F 7/06
USPC .............................. 376/272, 260, 268; 588/16
See application file for complete search history.

(56) References Cited

U.S. PATENT DOCUMENTS 4,780,269 A 10/1988 Fischer et al.
4,866,286 A * 9/1989 Baatz et al. ................ 250/507.1

FOREIGN PATENT DOCUMENTS

| DE | 3717189 C1 | 11/1988 |
| FR | 1395783 A | 4/1965 |
| GB | 1042680 A | 9/1966 |
| GB | 2336409 A | 10/1999 |
| RU | 2192677 C1 | 11/2002 |

OTHER PUBLICATIONS

International Search Report for PCT Application No. PCT/EP2007/063040 dated Mar. 12, 2008.
French Search Report for FR 0655295 dated Jul. 19, 2007.

* cited by examiner

*Primary Examiner* — Bernarr Gregory
(74) *Attorney, Agent, or Firm* — Nixon Peabody LLP

(57) ABSTRACT

The present invention is principally a device for transferring a nuclear fuel canister between a container for transporting said canister and a device for storing said canister. The transfer device comprises a body and a slide of longitudinal axis, capable of sliding in said body along its longitudinal axis (Y), said slide comprising at least a first compartment (C1), for removing a plug from the transport container and a plug from the storage device, and a second compartment (C3) for allowing the canister to pass from the transport container to the storage device and, conversely, means for sealing the transfer between the transport container and a transfer device and between the transfer device and the storage device.

7 Claims, 3 Drawing Sheets

DEVICE FOR TRANSFERRING NUCLEAR FUEL CANISTERS BETWEEN AND A TRANSPORT CONTAINER AND A STORAGE DEVICE

CROSS REFERENCE TO RELATED APPLICATIONS OR PRIORITY CLAIM

This application is a national phase of International Application No. PCT/EP2007/063040, entitled "DEVICE FOR TRANSFERRING NUCLEAR FUEL CARTRIDGES BETWEEN A TRANSPORT CONTAINER AND A STORAGE DEVICE", which was filed on Nov. 30, 2007, and which claims priority of French Patent Application No. 06 55295, filed Dec. 4, 2006.

DESCRIPTION

Technical Field and Prior Art

The present invention relates to a device for transferring nuclear fuel between a transport container and a storage device, and particularly a canister filled with spent nuclear fuel.

Within the scope of the management of irradiated fuel, after its use in reactors, said fuel is stored in a pool to be cooled before its evacuation to a storage device while awaiting a definitive outlet, which may be reprocessing or long term storage.

The irradiated fuel, which may be in fuel rod form, is stored in sealed canisters forming a first biological barrier.

These canisters are then intended to be transported in a transport container to a place of storage comprising a storage housing enabling the cooling of the fuel.

Such a transfer of a canister from the transport container to the storage device or conversely from the storage device to the transport container is known from document U.S. Pat. No. 4,780,269. Yet in this document, no biological barrier is provided between the container and the storage device in order to protect the external environment from radiation, particularly the personnel carrying out this transfer. Indeed, it is preferable to provide for a biological protection in addition to that formed by the canister in order to assure maximum safety for the personnel.

A sealable connecting device between shielded enclosures is also known from documents FR1 395 783 and GB 2 336 409; however these documents do not disclose how the covers of the enclosures may be withdrawn and isolated from the external environment.

Consequently, it is an aim of the present invention to present a device for transferring a nuclear fuel canister between a transport container and a storage device forming a continuous biological barrier between the nuclear fuel and the external environment.

DESCRIPTION OF THE INVENTION

The aforementioned aim is attained by a device comprising a body in which is moveably assembled a multifunctional slide capable of assuring the functions of withdrawal of caps from the transport container on the one hand, and from the storage device on the other hand, and transfer of the canister between the transport container and the storage device.

In other words, the transfer device forms a slide valve of large size, at least one stage of the slide making it possible to open the transport container and the storage device, and another stage of the slide enabling the actual transfer of the canister from the transport container to the transfer device and vice-versa.

Thus, the external environment is never in contact either with the canister, or with the inside of the storage device, or with the inside of the transport container, the transfer device assuring the confinement and limiting the leakage of contaminations.

The transfer device forms in itself a biological protection. This moreover comprises sealed devices making it possible to carry out its operations of loading and unloading of storage devices without breakage of confinement.

The device according to the invention moreover enables the opening of a transport container and the storage device without breakage of confinement, without need for additional biological protection and without direct human intervention.

The transfer device according to the present invention makes it possible in a particularly advantageous manner to carry out a loading or an unloading in the open air; it is not necessary to provide for these manipulations to be carried out within a confined space, the transfer device assuring in combination with the transport container and the storage device the necessary and sufficient confinement of the canister.

Moreover, this transfer device has the advantage of being portable and thus of being used for the loading of all the housings of a storage unit. This moreover reduces the cost of the storage.

The subject-matter of the present invention is then principally a device for transferring a nuclear fuel canister between a container for transporting said canister and a device for storing said canister, said container comprising a cylindrical cavity for receiving the canister and an opening sealed by a transport plug for the loading/unloading of the canister, said storage device comprising at least one housing to receive said canister and an opening sealed by a storage plug for the loading/unloading of said canister, said transfer device comprising a body and a slide of longitudinal axis, capable of sliding in said body along its longitudinal axis, said slide comprising at least one first compartment to withdraw a plug from the transport container and a plug from the storage device and a second compartment for allowing the canister to pass from the transport container to the storage device and conversely, and means for sealing the transfer between the transport container and the transfer device and between the transfer device and the storage device.

In a particularly advantageous example, the transfer device according to the invention also comprises an intermediate compartment between the first and the second compartment, comprising a passage in which are assembled means of withdrawing a biological protection cap contained in the storage device behind the plug, said cap being stored in said passage.

The first compartment may comprise an axial passage in which are assembled first means of withdrawing the plug from the transport container and seconds means of withdrawing the plug from the storage device, said withdrawal means being of the bayonet or clamp type, assembled in a sliding manner in said passage, said plugs being stored in said passage during the withdrawal.

In one embodiment, the first withdrawal means and the second withdrawal means are assembled head to tail, and are assembled in two chambers isolated from each other, which makes it possible to form a compact slide and avoid a transfer of contamination between the plugs.

The second compartment may comprise a passage of diameter greater than that of a canister for allowing a canister to be transferred between the transport container and the storage device via said passage, said diameter being substantially equal to that of the cavity of the transport container and to that of the housing of the storage device, this making it possible to limit impacts on the canister during its transfer.

The body of the transfer device may comprise a jacket defining an interior sealed space in which the slide can slide, said jacket comprising lateral end-plates each provided with an opening intended to be facing the cavity of the transport container and an opening intended to be facing the housing of the storage device, and said means for sealing the transfer comprising a first and a second inflatable seal integral with the lateral end-plates surrounding in a continuous manner each of the openings, and each intended to come into contact with one end face of the transport container and with one end face of the storage device respectively.

The lateral end-plates comprise advantageously removable panels enabling maintenance, said panels being assembled in a sealed manner in order to assure the sealing of the jacket.

For example, the slide is displaced by means of an electric motor.

The withdrawal means are for example operated by compressed air, which makes it possible to avoid pollution by oil.

A further subject-matter of the present invention is a method of transferring a nuclear fuel canister between a transport container and a storage device by means of a transfer device comprising a slide provided with at least one first compartment for the withdrawal of plugs from the transport container and the storage device, a second compartment for allowing the canister and sealing means to pass between the transfer device and the transport container and the storage device, said method comprising the steps of:

a) alignment of the transfer device with the transport container and the storage device, b) alignment of the first compartment of the slide with the cavity of the transport container and a housing of the storage device by moving the slide, c) removal of the transport plug and the storage plug, d) alignment of the second compartment with the cavity of the transport container and said housing of the storage device by moving the slide, e) sliding the canister between the storage device and the transport container.

Advantageously, the method according to the invention comprises a step c') of alignment of intermediate compartment with the cavity of the transport container and said housing of the storage device by moving the slide, and a step c") of withdrawing a cap contained in said housing set back from the storage plug.

The method may also comprise a step of inflating seals borne by the device and in contact with the transport container and the storage device to assure a sealed contact between the transfer device and the transport container and the storage device.

During step a), an attachment of the transfer device to the storage device and to the transport container may also be provided for.

BRIEF DESCRIPTION OF DRAWINGS

The present invention will be better understood on reading the description that follows and by referring to the appended drawings, in which.

DETAILED DESCRIPTION OF SPECIFIC EMBODIMENTS

Figure 1:
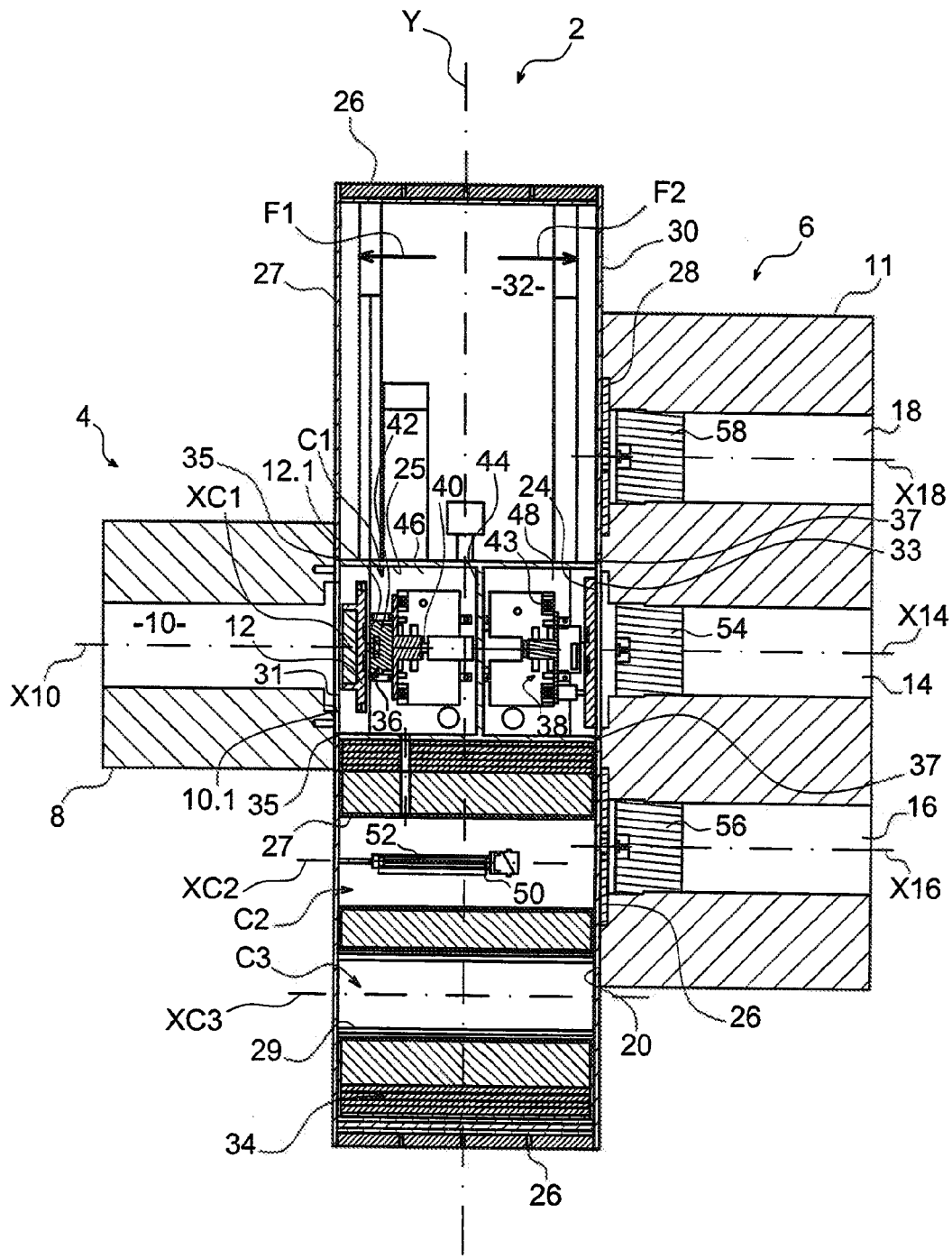
FIG. 1 is a longitudinal sectional view of a transfer device according to the present invention in a first position.

In FIG. 1, may be seen an example of an embodiment of a transfer device 2 according to the present invention in a state of opening of the transport container.

The transfer device according to the present invention is intended to be inserted between a transport container 4 and a storage device 6.

The transport container 4 comprises a body 8 provided with a cylindrical cavity 10 to receive a canister of axis X10. The cylindrical cavity 10 emerges from either side of the cylindrical body by a first end (not represented) and a second longitudinal end 10.1. The second end 10.1 is sealed by a removable plug 12, as well as the first end (not represented).

The storage device 6 comprises a body 11, in which are formed cylindrical housings 14, 16, 18 of axis X14, X16, X16 parallel to each other. Each housing 14, 16, 18 opens into a front face 20 of the storage device 6 and is sealed respectively by a plug 24, 26, 28. The storage device with three housings is given by way of example, this may comprise more or less than three housings, which may be distributed vertically and/or horizontally.

The transfer device 2 comprises a body of longitudinal axis Y intended to be orthogonal to the axes X10, X14, X16, X18.

The body comprises a sealed jacket 23 formed by the walls 26 at the longitudinal ends formed by panels, and front and rear lateral end-plates 27, 30 respectively.

The panels of the walls 26 are, for example, welded in order to assure a sealing at the longitudinal ends.

The lateral end-plates 27, 30, in the example represented, comprise removable panels to enable the maintenance of the transfer device 2. The sealable assembly of the panels is obtained for example by means of O-ring seals (not represented).

The jacket 23 delimits a sealed cavity 32 in which is assembled in a sliding manner a slide 34 along the Y axis.

The slide 34 is thus never in contact with the external environment.

The slide 34 comprises three compartments C1, C2, C3 each comprising a cylindrical passage 25, 27, 29 of axis XC1, XC2, XC3 respectively. The axes XC1, XC2, XC3 are parallel to each other and orthogonal to the Y axis.

In an advantageous manner, the transfer device comprises on each of its front lateral faces 27, 30 inflatable seals 35, 37 intended to come into contact with the longitudinal end face of the transport container 4.

Any other means capable of assuring a sealing between the transfer device and the transport container and the storage device could be suitable, for example O-ring seals or flexible sleeves.

Each seal 35, 37 comprises for example a circular shape intended to border the periphery of the open end 10.1 of the cavity 10 and the open end of a housing 14, 16, 18. Thus the seals 35, 37 assure a continuous confinement.

The front 27 and rear 30 end-plates comprise respectively an opening 31, 33 of diameter for allowing the plugs 12, 24, 26, 28 to pass, the openings 31, 33 are aligned along an axis orthogonal to the Y axis.

The compartment C1 comprises means 36 to enable the withdrawal of the sealing plug 12 from the transport container 4 and means 38 to enable the withdrawal of the transport plug 24, 26, 28 from the housing 14, 16, 18.

Since the withdrawal means 36, 38 are formed similarly, only the withdrawal means 36 will be described in a detailed manner.

The withdrawal means 36 comprise a jack 40 movable along the axis XC1 and provided with means 42 of attachment to the plug 12 of the transport container 4. For example these attachment means 42 are of the bayonet type or the clamp type. For example, one free end of the jack 40 comprises at least one pin capable of cooperating with a corresponding pin on an external face 12.1 of the plug 12 by rotation. The jack 40 moves in the direction indicated by the reference F1 to come up against the plug 12.

When the attachment of the jack 40 on the plug 12 is made, this slides in the opposite direction along the arrow F2, withdrawing the plug 12 from the end of the cavity 10 and freeing the access to the cavity 10.

The jack 40 is advantageously a pneumatic jack, the compressed air supply of which is provided from a nacelle which will be described later. A jack moved electrically could also be envisaged.

The internal diameter of the passage 25 is at least equal to the external diameter of the plugs 12, 24, 26, 28 to enable the storage of the plugs 12, 24, 26, 28 in the compartment C1.

The withdrawal means 38 comprise in a symmetrical manner a jack 43, assembled head to tail in relation to the jack 40 and operating in a symmetrical manner in relation to a plane P orthogonal to the axis XC1. Thus the jack 43 moves in the direction of the arrow F2 to come up against the plug 24, 26, 28 and moves in the direction F1 to withdraw it and enable access to the housing 14, 16, 18.

In an advantageous manner, a wall 44 is provided to isolate the withdrawal means 36 and the withdrawal means 38 so as to delimit two chambers 46, 48 separated in a sealed manner from each other. Thus no contamination borne by the plug 12 may be transferred to the plugs 14, 16, 18 and conversely.

The withdrawals of the plug 12 and one of the plugs of the storage device may be successive or simultaneous.

The compartment C1 thus enables the withdrawal and the storage of plugs from the transport container and the storage device and their storage.

The compartment C2 comprises means of withdrawing 50 a cap 54, 56, 58 assembled in each housing 14, 16, 18 behinds plugs 24, 26, 28 in order to form an additional biological barrier.

The withdrawal means 50 also comprise a jack 52 movable axially along the axis XC2 and capable of coming up against, by one free end, an external face of the cap 54, 56, 58.

The attachment may be, for example, of the bayonet type or the clamp type.

The internal diameter of the passage 27 of the compartment C2 is substantially equal to the external diameter of the biological protection cap 54, 56, 58, to enable its housing in the compartment C2.

The compartment C2 thus enables the withdrawal of the biological protection cap 54, 56, 58 from the housing of the storage device and its storage.

Similar means to those of the compartment C1 may also be provided for in the case where the transport container comprises a cap identical or similar to that 54, 56, 58 of the storage device.

The compartment C3 comprises an empty cylindrical passage to allow the canister to slide from the cavity 10 of the transport device to the housing 14, 16, 18 of the storage device.

The internal diameter of the passage 29 is substantially equal to that of the cavity 10 and the housings 14, 16, 18 in order to perform a movement without collision of the canister, thus when the axes X10 of the cavity 10, the XC3 axis of the compartment C3 and the axis X14 or X16 or X18 are aligned, the cavity 10, the passage 29 and the housing 14, 16, 18 form a channel having a substantially continuous cylindrical wall. The risks of impact are thus minimised.

The slide 34 is advantageously moved by an electric motor and rack system. A pneumatic motor may also be envisaged.

Thanks to the present invention, a continuity of the biological barrier is thus perfectly assured by forming a sealed passage for the transfer of the canister and by assuring the confinement of the plugs and biological protection caps, any transfer with the external environment being avoided.

According to the present invention, it is also provided to check the sealing of the contact between the inflatable seals 35, 37 and the transport container and the storage device respectively by means well known to those skilled in the art, of the pressure increase type. A vacuum is formed in the zone delimited by the inflatable seal supposed to be sealed and the pressure is checked. If it increases, the contact is not sealed and maintenance is required.

Moreover, a checking of the sealed assembly of the end-plates of the body during their assembly is provided for.

The transfer device according to the present invention is, for example, intended to be assembled on a nacelle (not represented) on which will be deposited the transport container 4 in contact with the front end-plate 27 of the transfer device, so as to align the axis X10 of the cavity 10 with the opening axis 31 provided in the front end-plate 27.

Thus the transfer device 2 and the transport container 4 are immobile in relation to each other.

Advantageously, removable linking means (not represented) between the container 4 and the transfer device 2 are provided to avoid any movement between them.

The nacelle can, for its part, move horizontally and vertically in order to align the axis of the opening made in the rear end-plate of the transfer device 2 with an axis X14, X16, X18 with a housing 14, 16, 18 respectively of the storage device 6. Removable linking means (not represented) between the storage device and the transfer device are also provided, in an advantageous manner, to avoid any movement between them.

The operation of the transfer device according to the present invention will now be explained. By way of non limiting example, it will be considered that it is wished to store the canister in the housing 14.

In an advantageous manner, the transfer device 2 is fastened to the storage device 6, during the operations of transferring the canister. Moreover, it is supported by the nacelle. To do this, the nacelle is moved in direction of the storage device 6 until the rear end-plate 30 is placed parallel to the front face of the storage device 6, so that the inflatable seal 37 comes into contact with the front face of the storage device 6. Before inflating the seal 37, the axis of the rear opening 33 is aligned with that of the housing 14.

The transport container loaded with a canister is placed on the platform of the nacelle so as to align the axis X10 of the cavity 10 and the axis of the front opening 31, guiding means may be provided for this purpose on the platform of the nacelle. The container may be placed on the nacelle before it comes up against the storage device.

The end face of the transport container 4 is placed sufficiently near to the front end-plate 27, so that the inflatable seal 35 borne by the front end-plate 27 comes into contact with the end face of the transport container 4 and forms a sealed zone around the front opening 31. The inflating of the seal 35 is carried out after the transport container 4 is put in place.

The slide 34 is then moved along the Y axis, so as to align the axis XC1 of the compartment C1 with those of the front 31 and rear 33 openings.

The means of withdrawing 36, 38 the plugs are successively or simultaneously operated to withdraw the plugs 12 and 24 as may be seen in FIG. 1.

Figure 2:
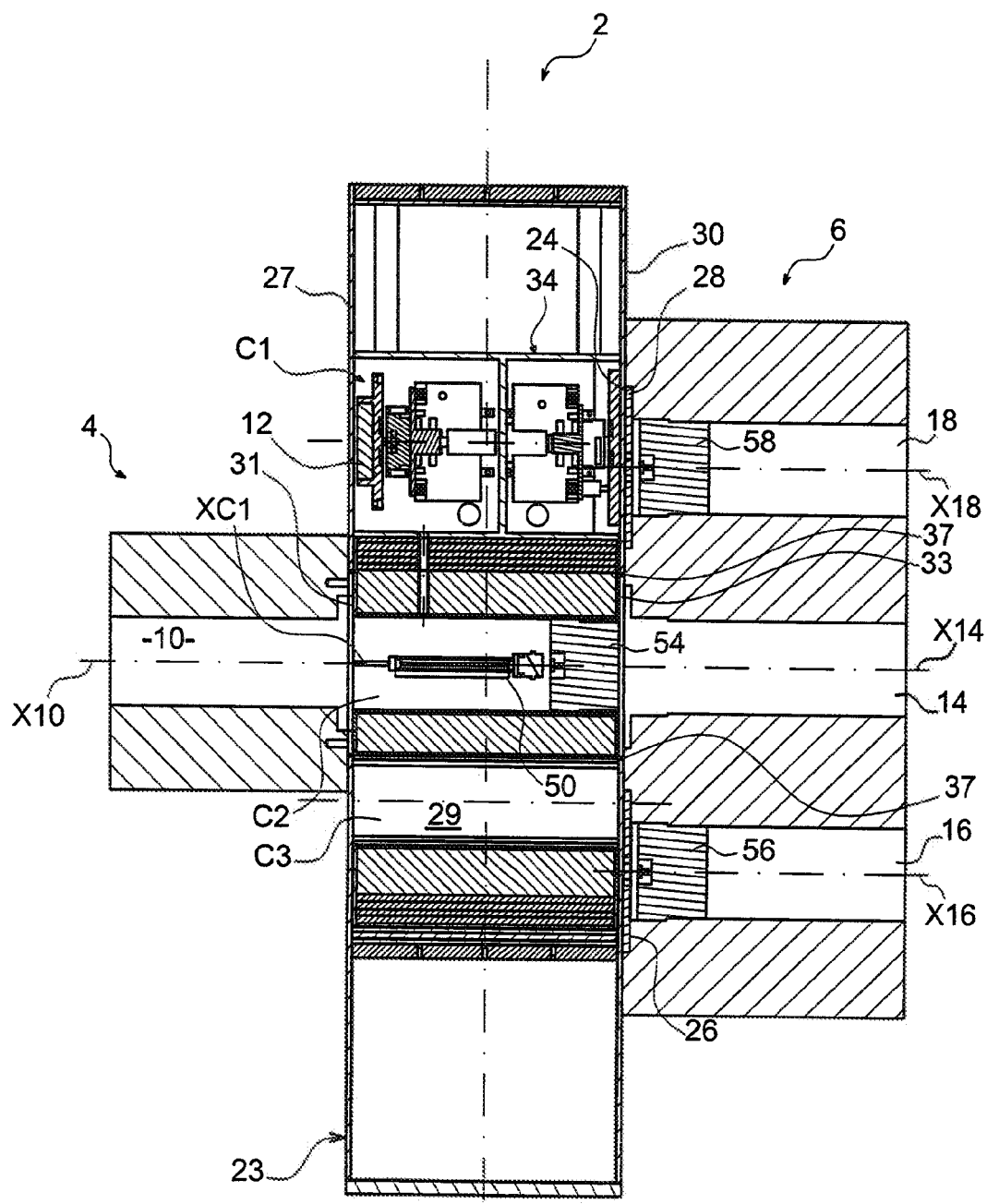
FIG. 2 is a view of the transfer device of FIG. 1 in a second position.
Figure 3:
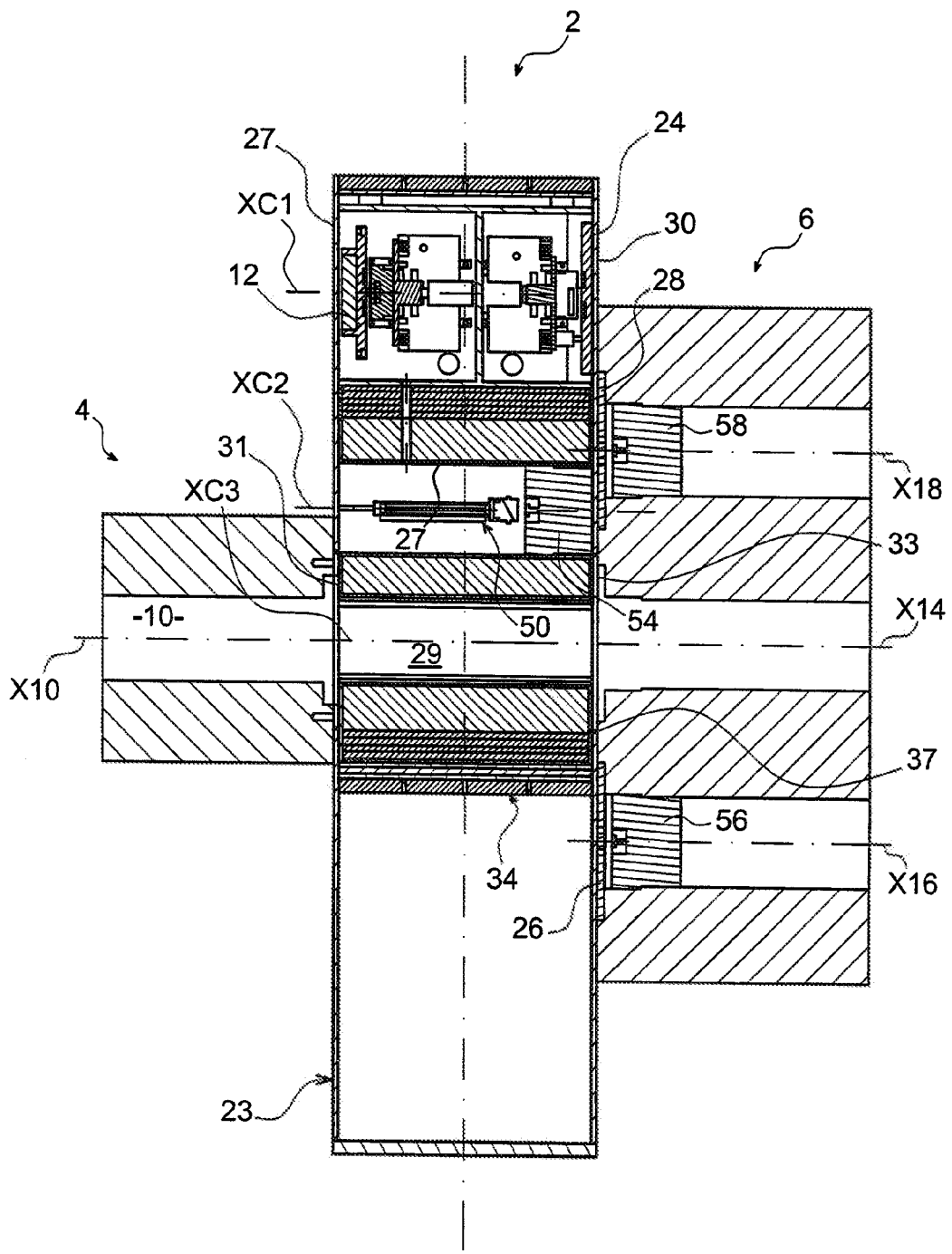
FIG. 3 is a view of the transfer device of FIG. 1 in a third position.

Then the slide 34 is moved along the Y axis upwards until the axis XC2 is aligned with the axes X14. The withdrawal means are then operated and the biological protection cap is withdrawn and stored in the passage 27, as is represented in FIG. 2.

The slide 34 is again moved upwards to align the XC3 axis with the axes X10 and X14. The canister is then moved from the cavity 10 to the housing 14 by sliding, for example by means of a jack that applies a pushing thrust on the canister. Traction means passing through the housing 14 and the passage 29 and attached to the canister could be envisaged.

When the canister is placed in the housing 14, the steps of putting back in place the biological protection cap then the plugs are carried out in a reverse manner to those described above.

For the loading of the other housings 16, 18, the same operating procedure is carried out.

For the withdrawal of the canisters from the housings 14, 16, 18 the same procedure is used except that, when the compartment C3 is aligned with the cavity 10 and the housing concerned, the canister is transferred from the housing of the storage device to the transport container.

At the end of the transfer operation, the transfer device is dissociated from the storage device, the nacelle is then freed.

Control means are provided inside the transfer device, these are advantageously visual, for example of the camera type, to check the position of the jacks and the state of removal of the plugs and the biological protection caps.

The control of the slide 34 is conducted by an operator, who orders the sliding of the slide 34 after having validated the end of the operation underway.

Likewise, it is the operator who manages the withdrawal of the plugs, caps and the transfer of the canister.

An automatic sequencing of the different steps could also be envisaged.

In the case where the biological protection cap 54, 56, 58 is not provided for or is removable in a different manner, a transfer device only comprising two compartments, the compartment for the withdrawal of the plug from the transport container and the plug from the housing of the storage device, and the compartment for the transfer of the canister do not fall outside of the scope of the present invention.

A transfer device wherein the withdrawal of the plug 12 and the withdrawal of the plug 24, 26, 28 takes place in two separate compartments also does not fall outside the scope of the present invention.

A transfer device comprising more than three compartments and/or comprising compartments assuring other functions also does not fall outside the scope of the present invention.

The method of transferring a canister between the storage device and the transport container by means of the transfer device according to the present invention comprises the steps of:

alignment of the cavity 10 and the housing 14 of the storage device to be loaded or unloaded with the openings 31, 33 of the transfer device, alignment of the compartment C1 with the cavity 10 and the housing 14, removal of the plugs 12, 24, alignment of the compartment C2 with the cavity 10 and the housing 14, if the housing 14 comprises a cap 54, removal of the cap 54, if necessary, alignment of the compartment C3 with the cavity 10 and the housing 14 and transfer of the canister from the cavity 10 to the housing 14 or from the housing 14 to the cavity 10.

It may be provided, after the first step, to immobilise the transfer device on the storage device and on the transport container.

A device making it possible to transfer, in a safe manner, the nuclear fuel contained in a canister between a transport container and a storage device has thus been produced.

The invention claimed is:

1. A transfer device for transferring a nuclear fuel canister between a transport container for transporting said canister and a storage device for storing said canister, said transport container comprising a cylindrical cavity for receiving the canister and an opening sealed by a transport plug for loading and unloading the canister, said storage device comprising at least one housing to receive said canister and an opening sealed by a storage plug for loading and unloading said canister, said transfer device comprising
a body, and
a slide having a longitudinal axis, wherein said slide slides in said body along the longitudinal axis,
said slide comprising at least:
a first compartment to withdraw the transport plug and the storage plug, said first compartment comprising an axial passage in which a means for withdrawing the transport plug and a means for withdrawing the storage plug are provided,
a second compartment for allowing the canister to pass from the transport container to the storage device and conversely,
an intermediate compartment between the first and the second compartment, comprising a passage in which are assembled means for withdrawing a biological protection cap contained in the storage device behind the plug, said cap being stored in said passage, and
means for sealing the transfer between the transport container and the transfer device and between the transfer device and the storage device.

2. Device according to claim 1, wherein said withdrawal means being of the bayonet or clamp type assembled in a sliding manner in said passage, said plugs being stored in said passage during the withdrawal.

3. Device according to claim 2, wherein the first withdrawal means and the second withdrawal means are assembled head to tail, and are assembled in two chambers isolated from each other.

4. Device according to claim 1, wherein the body comprises a jacket defining a sealed interior space in which the slide slides, said jacket comprising lateral end-plates each provided with an opening intended to be facing the cavity of the transport container and an opening intended to be facing the housing of the storage device, and said means for sealing the transfer comprising a first and a second inflatable seal integral with the lateral end-plates surrounding in a continuous manner each of the openings, and each intended to come into contact with one end face of the transport container and with one end face of the storage device respectively.

5. Device according to claim 4, wherein the lateral end-plates comprise removable panels enabling maintenance, said panels being assembled in a sealed manner in order to assure the sealing of the jacket.

6. Device according to claim 1, wherein the slide is moved by means of an electric motor.

7. Device according to claim 1, wherein the first compartment comprises an axial passage in which are assembled first means of withdrawing the transport plug and second means of withdrawing the storage plug, said withdrawal means being of the bayonet or clamp type assembled in a sliding manner in said passage, said plugs being stored in said passage during the withdrawal and wherein the withdrawal means are operated by compressed air.

* * * * *